US009499133B2

(12) United States Patent
Grasso et al.

(10) Patent No.: US 9,499,133 B2
(45) Date of Patent: Nov. 22, 2016

(54) METHOD FOR WASHING A VEHICLE WINDOW

(71) Applicant: Valeo Systèmes d'Essuyage, Le Mesnil Saint Denis (FR)

(72) Inventors: Giuseppe Grasso, Le Breuil sur Couze (FR); Grégory Kolanowski, Siaugues-Saint-Romain (FR); Pierre-Emmanuel Negre, Paris (FR); Marcel Trebouet, Chavenay (FR)

(73) Assignee: Valeo Systèmes d'Essuyage, Le Mesnil Saint Denis (FR)

(*) Notice: Subject to any disclaimer, the term of this patent is extended or adjusted under 35 U.S.C. 154(b) by 0 days.

(21) Appl. No.: 14/896,514

(22) PCT Filed: Jun. 13, 2014

(86) PCT No.: PCT/EP2014/062381
§ 371 (c)(1),
(2) Date: Dec. 7, 2015

(87) PCT Pub. No.: WO2014/198895
PCT Pub. Date: Dec. 18, 2014

(65) Prior Publication Data
US 2016/0121854 A1 May 5, 2016

(30) Foreign Application Priority Data

Jun. 14, 2013 (FR) ..................... 13 55550

(51) Int. Cl.
| B08B 7/00 | (2006.01) |
| B60S 1/52 | (2006.01) |
| B60S 1/50 | (2006.01) |
| B60S 1/46 | (2006.01) |
| B60S 1/48 | (2006.01) |
| B08B 1/00 | (2006.01) |
| B08B 3/00 | (2006.01) |
| B08B 3/02 | (2006.01) |

(52) U.S. Cl.
CPC ............ *B60S 1/524* (2013.01); *B60S 1/482* (2013.01); *B60S 1/50* (2013.01); *B08B 1/00* (2013.01); *B08B 1/006* (2013.01); *B08B 3/00* (2013.01); *B08B 3/02* (2013.01); *B60S 1/46* (2013.01); *B60S 1/48* (2013.01); *B60S 1/481* (2013.01); *B60S 1/485* (2013.01)

(58) Field of Classification Search
CPC ............ B60S 1/46; B60S 1/48; B60S 1/481; B60S 1/482; B60S 1/485; B60S 1/50; B60S 1/524; B08B 1/00; B08B 1/006; B08B 3/00; B08B 3/02
See application file for complete search history.

(56) References Cited

U.S. PATENT DOCUMENTS

| 2001/0003352 A1* | 6/2001 | Ruden ....................... B60S 1/50 239/284.2 |
| 2003/0041900 A1* | 3/2003 | Wojan .................... B60S 1/481 137/79 |
| 2012/0056004 A1 | 3/2012 | Trager | |

FOREIGN PATENT DOCUMENTS

| DE | 10 2005 031721 A1 | 6/2006 |
| DE | 10 2008 052063 A1 | 4/2010 |
| WO | 03/020559 A1 | 3/2003 |

OTHER PUBLICATIONS

International Search Report issued in PCT/EP2014/062381 mailed on Aug. 4, 2014 (3 pages).

*Primary Examiner* — Bibi Carrillo
(74) *Attorney, Agent, or Firm* — Osha Liang LLP

(57) ABSTRACT

The invention relates to a method for washing a motor vehicle wind shield (10) using a washing device (1) comprising reservoirs (2, 3) of first and second fluids, a channel (5) connecting the reservoirs (2, 3) to orifices (15) for ejecting the fluids onto the wind shield, at least one pump (20) intended to circulate the fluids in the channel (5), and at least one wiper blade (30), characterized in that, when the channel contains the first fluid, the method comprises the following steps: a) activating the pump system (20) so as to cause the second fluid to circulate in the channel system (5) so as to purge the channel of the first fluid, and b) deactivating the pump system (20) when the second fluid reaches the orifices (15).

17 Claims, 5 Drawing Sheets

METHOD FOR WASHING A VEHICLE WINDOW

BACKGROUND OF THE INVENTION

The technical sector of the present invention is that of methods for washing a window of a vehicle, in particular a motor vehicle, by using a system for wiping and washing said window. A system of this type is more particularly designed to be installed on a windscreen of the vehicle.

Motor vehicles are commonly equipped with a wiping installation and washing system in order to ensure wiping and washing of the windscreen and to prevent the driver's view of his/her environment from being disrupted. An installation of this type generally comprises two wiper blades which scrape the outer surface of the windscreen, so as to discharge the water which is present on this surface.

For the purpose of washing the windscreen, in particular in the absence of rain, systems of this type are equipped with a reservoir containing a cleaning liquid, known as the first liquid, of a piping system which connects the reservoir to orifices via which the first liquid can be ejected onto the windscreen, and with a pump which can circulate the first liquid in the piping system until it is expelled via the orifices onto the windscreen.

For the purpose of improving the quality of the cleaning, particularly in the case when the windscreen is very dirty, and/or in order to add other functions to the cleaning system, such as, for example, de-icing of the windscreen, it is known to provide a second reservoir containing an active liquid, known as the second liquid, with better cleaning properties and/or de-icing properties. Active liquids of this type are more costly than the conventional cleaning liquids.

The two reservoirs can each have their pump, but they are connected to the same piping system which conveys the first and second liquids to the orifices via which they are ejected onto the windscreen. Thus, when it is wished to change from spraying one of the liquids onto the windscreen to spraying the other one of the liquids, the pump which was functioning is deactivated and the other pump is activated.

A disadvantage is derived from the fact that, when one pump is deactivated and the other one is activated, the activated pump will circulate a first liquid in the piping system, which will drive the second liquid which has remained in the system, as far as the ejection orifices. Second liquid which is not required will therefore be ejected onto the windscreen before the first liquid, which is not economical. In addition, if the windscreen wipers are put into motion as soon as the pump is activated, the first liquid will reach the windscreen in a manner which is offset relative to the functioning of the wiper blades.

BRIEF SUMMARY OF THE INVENTION

The objective of the invention is to resolve at least some of these problems, and for this purpose it relates to a method for washing a motor vehicle windscreen by means of use of a washing device comprising:

- a first reservoir containing a first fluid, and a second reservoir comprising a second fluid;
- a piping system which connects the first reservoir and the second reservoir to orifices via which the first fluid and/or the second fluid is/are ejected onto the windscreen;
- a pump system which is designed to circulate the first fluid and/or the second fluid in the piping system until ejection via said orifices takes place; and
- at least one wiper blade which can be displaced on the windscreen, between a low position and a high position, characterized in that, with the piping system containing first fluid, the method comprises the steps of:

a) activation of the pump system, so as to circulate second fluid in the piping system, so as to purge the first fluid from the piping system; and
b) deactivation of the pump system at the moment when the second fluid reaches the orifices.

The invention is particularly advantageous since it makes it possible to ensure that the piping system is filled with second fluid, and that the latter will be ejected onto the windscreen of the vehicle as soon as the pump system is next activated, without first fluid being ejected before or with the second fluid. The invention thus makes it possible to prevent ejection of the liquid which is not required, and therefore to prevent wasting of the liquid. The invention also makes it possible to improve the efficiency of the cleaning of the windscreen.

The washing device is thus regulated to determine the moment when the purging is completed, i.e. the moment when one of the two fluids has driven the other fluid to the exterior of the piping system by means of ejection via the orifices. This regulation can be carried out by controlling and managing a plurality of parameters such as the flow rate of the pump system, the viscosity of the first and second fluids, the ambient temperature, the content of the piping system, and/or the length of the piping system.

According to an aspect of the invention, the wiper blade is put into motion from its low position as soon as the step a) begins.

According to an embodiment of the invention, the step b) is carried out when the wiper blade has reached a predetermined intermediate position, in a rising wiping phase. It is thus possible to optimize the distribution of the first fluid on the windscreen by programming the intermediate position of the wiper blade starting from which ejection of the first fluid onto the windscreen is stopped. This prevents ejection of the first fluid when the blade is in its high position, this fluid being liable not to reach the windscreen in this position of the blade, and thus limits wasting of the first fluid.

In the present application, rising wiping phase means a phase of displacement or putting into motion of the blade from its low position to its high position. Descending wiping phase means a phase of displacement or putting into motion of the blade from its high position to its low position. Between its low and high, or high and low, positions, the wiper adopts a multitude of intermediate positions.

Advantageously, before the step a), the washing method comprises a preliminary step in which the pump system is activated in order to circulate first fluid in the piping system. It is thus possible to determine exactly the quantity of first fluid present in the piping system after this step. The objective is in particular to fill the piping system which could be empty, for example as a result of lack of use of the device for a certain time, and of evaporation of the fluid contained in the piping system.

According to an aspect of the invention, the pump system is in the deactivated state and the wiper blade is in the low position for a predetermined pause period T1, between the preliminary step and the step a).

According to one embodiment, after the step b), the washing method comprises a step c) in which the pump system is activated, so as to circulate first fluid in the piping system, so as to purge the second fluid from the piping system, and a step d) in which the pump system is deactivated at the moment when the first fluid reaches the orifices. Here, a second purge is carried out, which makes it possible to empty the second fluid from the piping system, and to fill it with the first fluid, without discharging the first fluid from the ejection orifices. Thus, the method according to the invention makes it possible to continue to use second fluid by driving it with the first fluid, so that, at the moment when it is wished to use the first fluid, this fluid is already at the output of the orifices. The second fluid will then not be wasted, and the first fluid will be able to be ejected at the required moment and in the required location on the windscreen. The method according to the invention thus comprises two successive steps of purging of the piping system.

Advantageously, the washing method comprises a step e) of putting the wiper blade into motion from its high position, before the step c) begins.

According to an aspect of the invention, the step c) is carried out starting from the moment when the wiper blade is in a first predetermined intermediate position, and until the moment when the wiper blade is in a second predetermined intermediate position, in the same phase of descending wiping. There is therefore exact determination of the period during which it is wished to eject the second fluid onto the windscreen, and the area of the windscreen onto which it is wished to deposit this fluid.

According to an embodiment of the invention, the pump system is in the deactivated state and the wiper blade is in the low position for a predetermined pause period T2, after the end of the step e). By means of this pause, the second fluid which is present on the windscreen will be able to act on the dirt or the frost before the wiper blade begins to move again.

Advantageously, after the end of the step e), or the pause T2, the washing method comprises a step f) of driving the wiper blade from its low position to its high position, and from its high position to its low position.

According to an aspect of the invention, during the step f), the washing method comprises at least one of the following steps:
  activation of the pump system, in order to eject first fluid via the orifices, between the moment when the wiper blade is in the low position and the moment when the blade is in a predetermined intermediate position, in a rising wiping phase;
  activation of the pump system, in order to eject first fluid via the orifices, between the moment when the wiper blade is in an intermediate position and the moment when the blade is in another intermediate position, in a rising wiping phase;
  activation of the pump system in order to eject first fluid via the orifices, between the moment when the wiper blade is in an intermediate position and the moment when the blade is in the high position, in a rising wiping phase;
  activation of the pump system in order to eject first fluid via the orifices, between the moment when the wiper blade is in the high position and the moment when the blade is in an intermediate position, in a descending wiping phase;
  activation of the pump system in order to eject first fluid via the orifices, between the moment when the wiper blade is in an intermediate position and the moment when the blade is in another intermediate position;
  activation of the pump system in order to eject first fluid via the orifices, between the moment when the wiper blade is in an intermediate position and the moment when the blade is in the low position, in a descending wiping phase; and
  deactivation of the pump system during driving of the wiper blade from its high position to its low position, or from its low position to its high position.

According to an embodiment of the invention, the pump system is in the deactivated state, and the wiper blade is in the low position, for a predetermined pause period T3 after the step f).

Advantageously, after the step f) or the pause T3, the washing method comprises a step g) of driving the wiper blade from its low position to its high position, and from its high position to its low position.

According to an aspect of the invention, after the step g), the washing method comprises a step h) of checking the state of cleanliness of the windscreen, at least some of the aforementioned steps of the washing method being repeated according to the result obtained in the step h). Thus, according to the state of cleanliness of the windscreen, it is possible to repeat all the steps of the washing method, or some of these steps, in particular the step c).

According to one embodiment, the first fluid is a washing fluid and the second fluid is a de-icing and/or anti-insect fluid, or the first fluid is a de-icing and/or anti-insect fluid and the second fluid is a washing fluid. The de-icing and/or anti-insect fluid is more costly than the washing fluid. The method according to the invention thus makes it possible to use the required fluid at the correct moment, without waste, in particular as far as the de-icing and/or anti-insect fluid is concerned.

Advantageously, the pump system comprises two independent pumps, i.e. a first pump which is associated with the first reservoir and is designed to circulate the first fluid, and a second pump which is associated with the second reservoir and is designed to circulate the second fluid.

According to an aspect of the invention, the orifices are situated on the wiper blade and/or on the hood of a vehicle.

According to one embodiment, the, or each, wiper blade sprays liquid towards the top of the blade. The, or each, wiper blade has for example a single ramp. The aforementioned orifices for ejection of the fluid can thus open towards the top of the blade(s).

BRIEF DESCRIPTION OF THE DRAWING

Other characteristics and advantages of the invention will become apparent from reading the following description of embodiments provided by way of illustration with reference to the appended figures. In these figures.

DETAILED DESCRIPTION OF THE INVENTION

Figure 1:
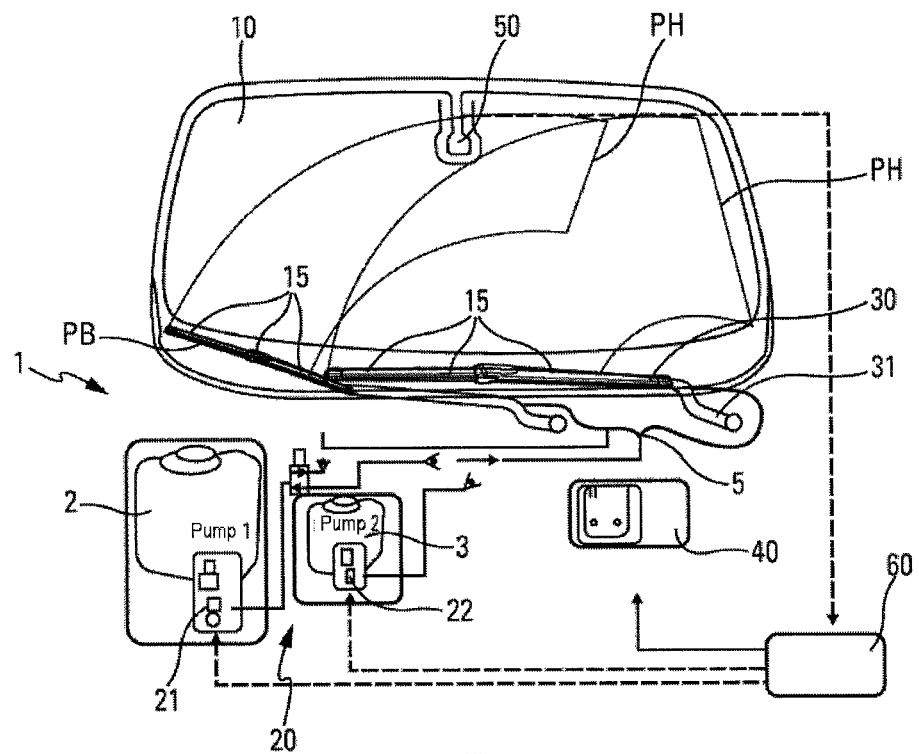
FIG. 1 is a schematic view of a device for washing a windscreen of a motor vehicle.

The washing method according to the invention uses a washing device 1 which is applied on a windscreen 10 of a motor vehicle, as illustrated in FIG. 1. A washing device of this type comprises a first reservoir 2 containing a first fluid, and a second reservoir 3 comprising a second fluid. The first fluid is for example a cleaning liquid. The second fluid is in particular a de-icing and/or anti-insect liquid, i.e. an active liquid which permits de-icing of the windscreen and/or particular cleaning of the windscreen 10.

The washing device 1 also comprises a piping system 5 which connects the first reservoir 2 and the second reservoir 3 to orifices 15 via which first fluid and/or second fluid is/are ejected onto the windscreen 10. It additionally comprises a pump system 20 which is designed to circulate first fluid and/or second fluid in the piping system 5, until it is ejected via the orifices 15. In this case, the pump system 20 comprises two independent pumps 21, 22. A first pump 21 is associated with the first reservoir 2, and is designed to circulate first fluid in the piping system 5, and a second pump 22 is associated with the second reservoir 3, and is designed to circulate second fluid in the piping system 5.

The washing device 1 comprises at least one wiper blade 30 which is fitted on an arm 31 and can be displaced on the windscreen 10, between a low position PB and a high position PH. The washing device 1 in FIG. 1 comprises two wiper blades 30. The aforementioned orifices 15 are for example situated on the wiper blades 30. They can also be situated on the arm 31. The orifices 15 are in this case arranged such as to spray first fluid and/or second fluid towards the top of the wiper blades 30, i.e. towards the top of the windscreen 10.

The wiper blade 30 is for example a blade comprising at least one ramp which is designed to spray liquid towards the top of the blade or in the direction of the high position PH.

The washing device 1 also comprises a motor 40 which is designed to drive the wiper blades 30 between their respective low positions and high positions. The washing device 1 additionally comprises at least one sensor 50. In this case, it is situated on a high part of the windscreen, in the center of the latter. In particular it is situated at an area of the windscreen 10 which is swept by a single one of the two wiper blades 30.

The washing device 1 additionally comprises an electronic box 60 which can analyze the data obtained from the sensor 50 and control the motor 40 for driving the wiper blades 30 and activating the pump system 20, the first and second pumps 21, 22 being able to be controlled independently. The sensor 50 is for example a sensor for rain, a sensor for opacity of the windscreen, and/or a sensor for light.

Figure 2:
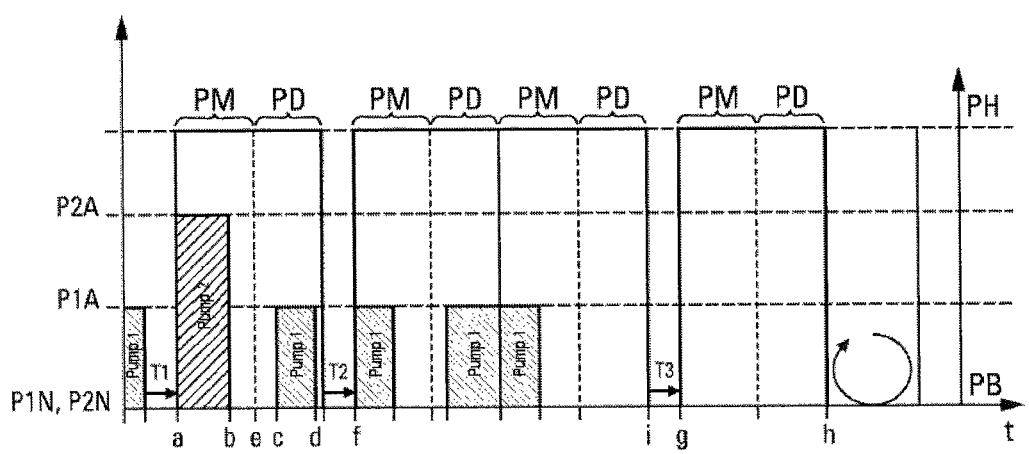
FIG. 2 is a graph illustrating different steps of an embodiment of the washing method according to the invention.

FIG. 2 illustrates an embodiment of the washing method according to the invention, and represents a graph which shows on the X-axis the time t, and on the Y-axis both the state of the activated/deactivated pump(s) on the left in the drawing (P1A/P1N=first pump activated/deactivated, and P2A/P2N=second pump activated/deactivated), and the position of the wiper blades (PB=low position and PH=high position). The indices PM and PD also designate respectively rising and descending wiping phases of the wiper blades 30, i.e. phases when the blades are in motion. This washing method is preferably implemented when the vehicle equipped with the washing device is at a standstill.

Figure 3:
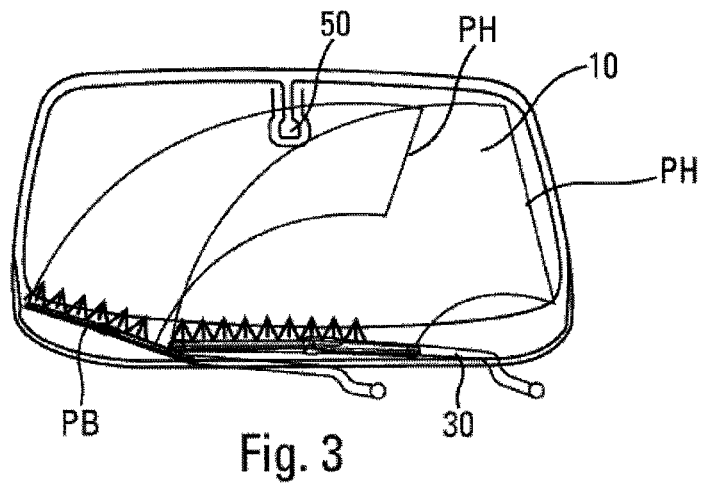
FIGS. 3 to 13 are schematic views of the windscreen and the wiper blades of the washing device in FIG. 1, at different steps of the washing method illustrated in FIG. 2.

As can be seen in FIGS. 2 and 3, the method comprises a preliminary step in which the pump system 20 is activated in order to circulate first fluid in the piping system 5. For this purpose the first pump 21 is activated. This step makes it possible to fill the piping system 5 with first fluid. The pump 21 is deactivated as soon as first fluid begins to be ejected onto the windscreen 10, or at the moment when first fluid reaches the orifices 15.

The method then comprises a pause step with the period T1, during which the pump system is deactivated and the wiper blades 30 are at rest.

Figure 4:
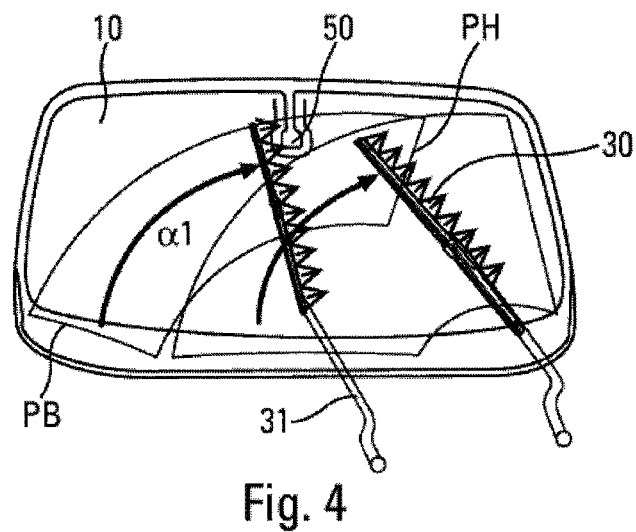

The method then comprises a step a) of activation of the pump system 20, so as to circulate second fluid in the piping system 5 and to purge the first fluid from the piping system 5 (FIGS. 2 and 4). It is understood here that it is the second pump 22 which is activated in order to fill the piping system 5 with second fluid, and drive the first fluid which is contained in the piping system until it is ejected onto the windscreen 10. The method additionally comprises a step b) of deactivation of the pump 22, at the moment when the second fluid reaches the orifices 15. The piping system 5 is then filled with second fluid, second fluid being situated in the piping system 5 as far as the orifices 15, so that the first fluid is completely purged from the system 5. A plurality of parameters can be taken into consideration in order to determine the moment when the purge is completed, such as, for example, the flow rate of the pump 22, the viscosity of the fluids, the ambient temperature, the content of the piping system, and/or the length of the latter.

The pump 22 is activated in the step a) simultaneously with the putting into motion of the wiper blades 30, which were each in a position of rest or low position PB, as can be seen in FIG. 3.

The step b) (deactivation of the pump 22) takes place when the wiper blades 30 have reached predetermined intermediate positions, in a rising wiping phase. In these intermediate positions represented in FIG. 4, the wiper blades have each been driven (in rotation around their axes of articulation) according to an angle $\alpha 1$ measured from the low positions PB, which is smaller than the maximum angle of rotation of each of the blades when they are driven from their low positions PB to their high positions PH. The regulation of the angle $\alpha 1$ makes it possible to regulate with precision the area on which it is wished to deposit first fluid, and the quantity of first fluid deposited. When the wiper blades have each been driven according to the angle $\alpha 1$, they are for example at 10° from their respective high positions. The angle $\alpha 1$ can be specific to each of the wiper blades 30 of the washing device, in particular if the aforementioned maximum angles (angles between the low and high positions) are different from one wiper blade to the other of the same washing device.

Figure 5:
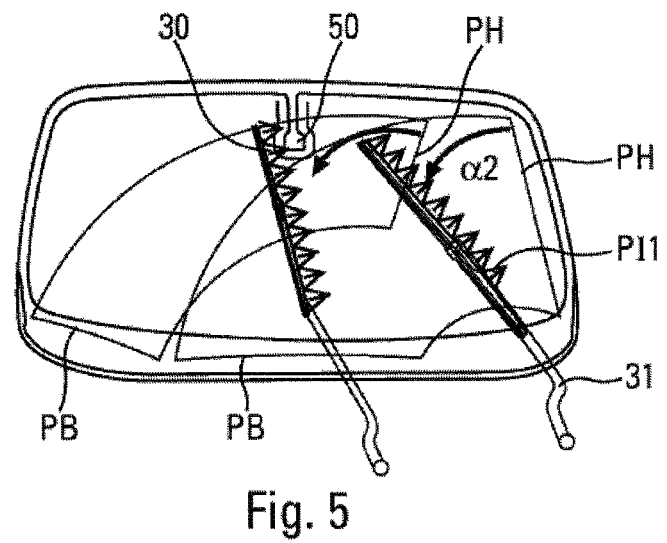
Figure 6:
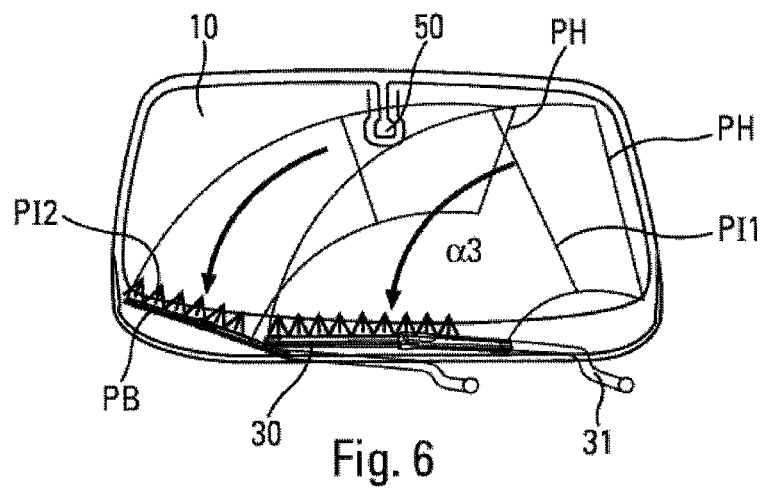

Although the pump 22 is deactivated, the wiper blades 30 continue their courses until they reach their high positions PH. They are then driven from their high positions to their low positions PB (step e)), as illustrated in FIGS. 2, 5 and 6. During this descending wiping phase, the method according to the invention comprises a step c) in which the pump system 20 is activated so as to make first fluid circulate in the piping system 5, so as to purge the second fluid from the piping system. It is understood here that it is the first pump 21 which is activated in order to fill the piping system 5 with first fluid, and thus eject the second fluid contained in the piping system 5 onto the windscreen.

The method also comprises a step d) in which the pump 21 is deactivated at the moment when first fluid reaches the orifices 15. In the same manner as previously explained, the second fluid is thus driven from the piping system 5 which therefore now contains only first fluid, which extends in the piping system 5 as far as the ejection orifices 15.

It can be seen in FIGS. 2, 5 and 6 that the step c) is carried out from the moment when the wiper blades 30 are in first predetermined intermediate positions PI1, and up to the moment when the wiper blades are in second predetermined intermediate positions PI2, in the same descending wiping phase. In the first intermediate positions represented in FIG. 5, the wiper blades 30 have each been driven according to an angle $\alpha 2$ measured from their high positions PH, and, in the second intermediate positions represented in FIG. 6, the wiper blades 30 have each been driven according to an angle α3 measured from their high positions PH. α3 is greater than α2 (relative to the high positions), since the blades reach these positions in the same descending wiping phase, and the blades reach the first intermediate positions at the angles α2 before the second intermediate positions at the angles α3. It can be seen in FIG. 2 in particular that the step d) (deactivation of the pump 21) takes place when the wiper blades have not yet reached their low positions PB. As previously explained, the regulation of the angles α2 and α3 makes it possible to regulate with precision the area on which it is wished to deposit second fluid, and the quantity of second fluid deposited. In addition, the angles α2 and α3 specific to one wiper blade can be different from the angles α2 and α3 specific to the other blade of the washing device, as previously explained. By way of example, the angle α2 is equal to 10°, and when the wiper blades have been driven according to the angle α3, they are for example at 10° from their low positions.

Figure 7:
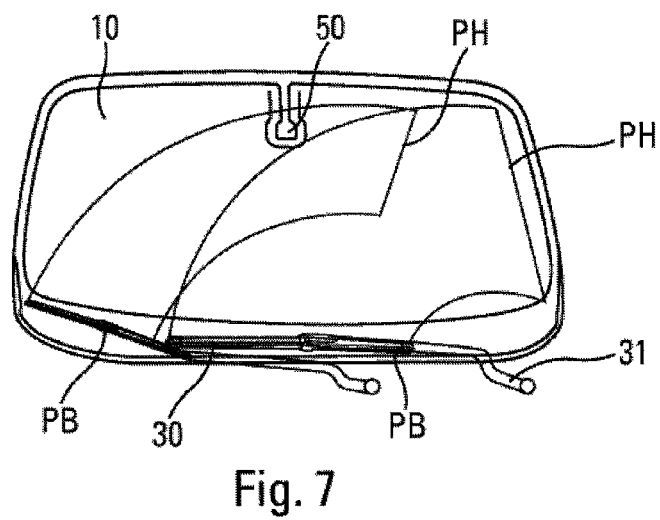
Figure 8:
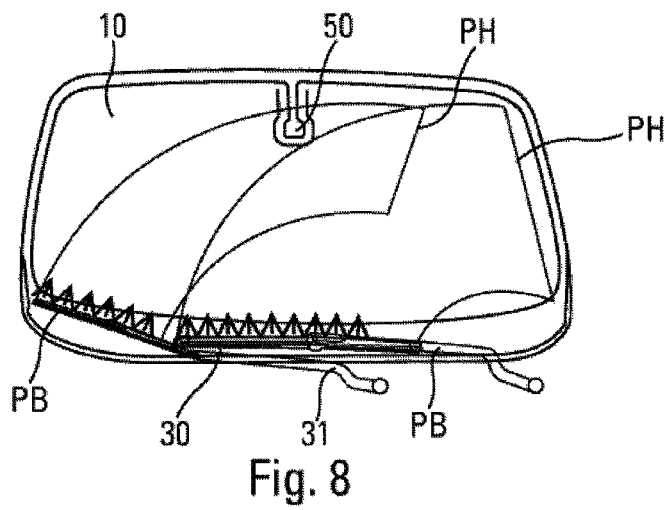
Figure 9:
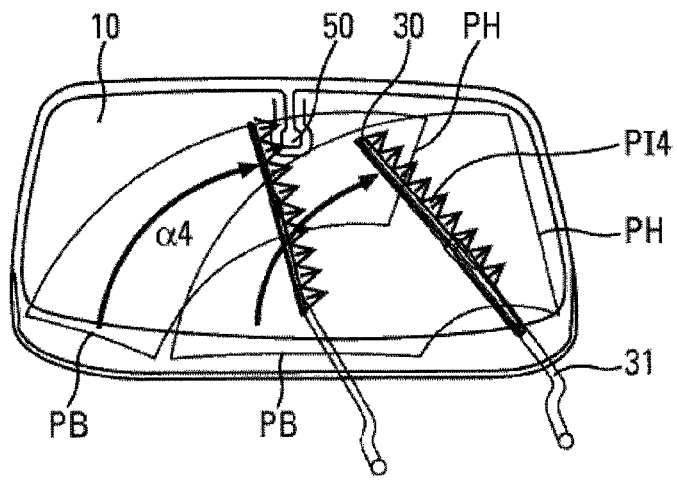
Figure 10:
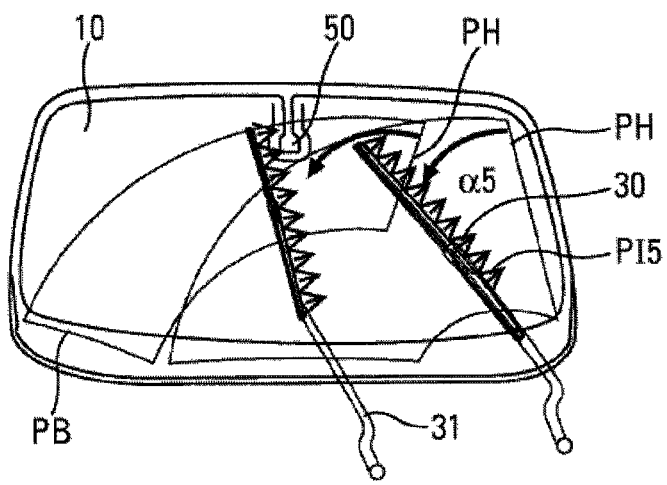

The wiper blades then reach their low positions PB, and are left in this position for a predetermined pause period T2, as illustrated in FIGS. 2 and 7. The pump system 20 is in the deactivated state during the period T2. Thus, the second fluid is left on the windscreen 10 during this pause period T2, so that it has time to act, in particular on the dirt and/or frost. This period T2 is for example a few seconds.

As illustrated in FIGS. 2 and 8 to 10, after the aforementioned pause, the washing method according to the invention comprises a step f) of driving the wiper blades 30 from their low positions PB to their high positions PH, and from their high positions PH to their low positions PB.

During this step f), the washing method comprises a sub-step (FIGS. 8 and 9) of activation of the pump system 20, in this case the first pump 21, in order to eject first fluid via the orifices 15, between the moment when the wiper blades are in their low positions PB, and the moment when the wiper blades are in predetermined intermediate positions PI4. In these positions PI4, the wiper blades have each been driven on the windscreen according to an angle α4 measured from their low positions PB, and smaller than the aforementioned maximum angles (angles between the low and high positions). The pump system is then deactivated at the moment when the blades reach the predetermined intermediate positions PI4. When the wiper blades have each been driven according to the angle α4, they are for example at 10° from their high positions.

After having reached their high positions PH, and during a subsequent descending wiping phase of the wipers, the washing method can comprise another sub-step (FIG. 10) of activation of the pump system 20, in this case the first pump 21, in order to eject first fluid via the orifices 15, between the moment when the wiper blades are in predetermined intermediate positions PI5 and the moment when the blades are in their low positions PB. In the predetermined intermediate positions P15, the wiper blades have each been driven on the windscreen according to an angle α5 measured from their high positions PH, and smaller than the aforementioned maximum angles (angles between the low and high positions). The angle α5 is for example substantially equal to 10°.

The washing method can also comprise a further step of driving the wiper blades 30 from their low positions PB to their high positions PH, and from their high positions PH to their low positions PH. During this step, the washing method comprises a sub-step (FIG. 2) of activation of the pump system 20, in this case the first pump 21, in order to eject first fluid via the orifices 15, between the moment when the wiper blades are in their low positions PB and the moment when they are in predetermined intermediate positions. The pump system is in the deactivated state starting from the moment when the wiper blades reach these intermediate positions, and also whilst the wiper blades go from their high positions to their low positions.

Figure 11:
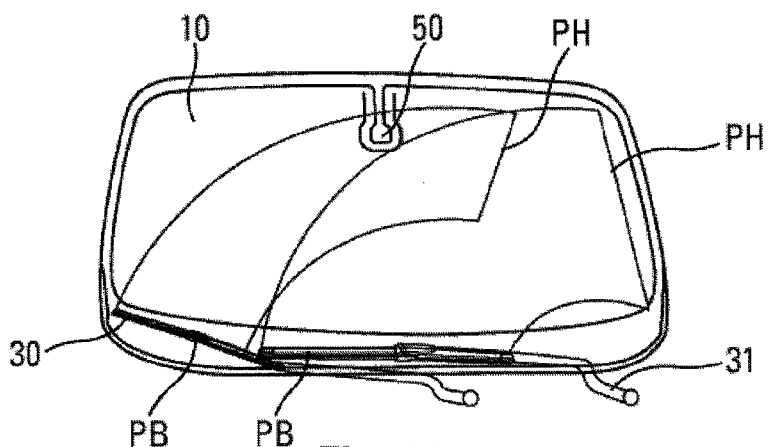

As illustrated in FIG. 11, after the end of the step f), the method also comprises a step i) in which the pump system is deactivated and the wiper blades are in their low positions PB for a predetermined pause period T3. The duration of T3 is for example a few seconds.

Figure 12:
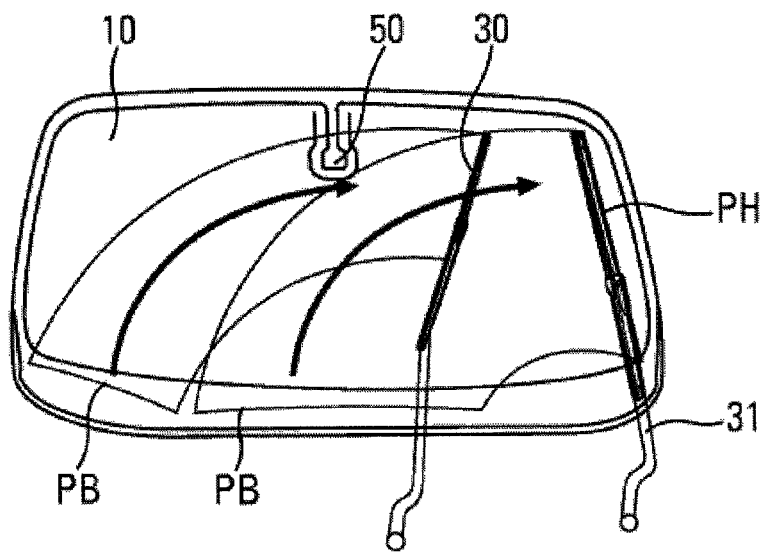
Figure 13:
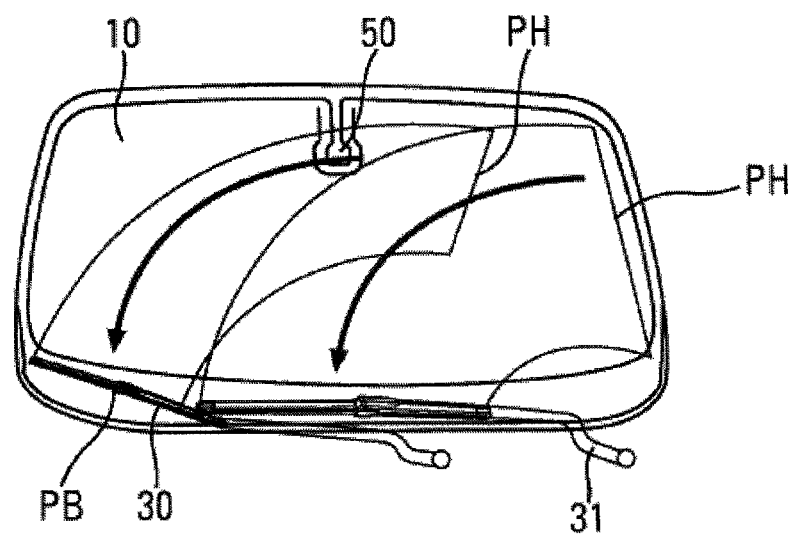

As illustrated in FIGS. 12 and 13, after the step i), the washing method then comprises a step g) of driving the wiper blades 30 from their low positions to their high positions, and from their high positions to their low positions. The pump system is deactivated during this step. This step makes it possible in particular to wipe the windscreen in order to remove the residues of fluid and/or dirt which could still be on the windscreen.

Finally, after the step g), the washing method comprises a step h) of checking the state of cleanliness of the windscreen by means of the sensor(s) 50, and at least some of the aforementioned steps of the washing method can be repeated according to the result obtained in the step h).

In general the parameters α1, α2, α3, α4, α5, T1, T2 and/or T3 are determined such as to optimize the consumption of fluids by the device, as well as the duration of the washing method or cycle, and consequently to improve the efficiency of the cleaning.

The invention claimed is:

1. A method for washing a motor vehicle windscreen by use of a washing device, the washing device comprising:
   a first reservoir containing a first fluid, and a second reservoir comprising a second fluid;
   a piping system which connects the first reservoir and the second reservoir to orifices via which the first fluid and/or the second fluid is/are ejected onto the windscreen;
   a pump system which is designed to circulate the first fluid and/or the second fluid in the piping system until ejection via said orifices takes place; and
   at least one wiper blade which can be displaced on the windscreen, between a low position and a high position,
   wherein, with the piping system containing the first fluid, the method comprising the steps of:
   a) activation of the pump system, so as to circulate second fluid in the piping system, so as to purge the first fluid from the piping system; and
   b) deactivation of the pump system at the moment when the second fluid reaches the orifices.

2. The washing method as claimed in claim 1, wherein the wiper blade is put into motion from the low position as soon as the step a) begins.

3. The washing method as claimed in claim 1, wherein before the step a), a preliminary step is performed in which the pump system is activated in order to circulate the first fluid in the piping system.

4. The washing method as claimed in claim 1, wherein, after the step b), the method comprises a step c) in which the pump system is activated, so as to circulate the first fluid in the piping system, so as to purge the second fluid from the piping system, and a step d) in which the pump system is deactivated at the moment when the first fluid reaches the orifices.

5. The method as claimed in claim 1, wherein the first fluid is a washing fluid and the second fluid is a de-icing and/or anti-insect fluid, or the first fluid is a de-icing and/or anti-insect fluid and the second fluid is a washing fluid.

6. The washing method as claimed in claim 1, wherein the pump system comprises two independent pumps comprising a first pump corresponding with the first reservoir and is designed to circulate the first fluid, and a second pump corresponding with the second reservoir and is designed to circulate the second fluid.

7. The washing method as claimed in claim 1, wherein each wiper blade sprays liquid towards the top of the blade.

8. The washing method as claimed in claim 2, wherein the step b) is carried out when the wiper blade has reached a predetermined intermediate position, in a rising wiping phase.

9. The washing method as claimed in claim 3, wherein the pump system is in the deactivated state and the wiper blade is in the low position for a predetermined pause period T1, between the preliminary step and the step a).

10. The washing method as claimed in claim 4, further comprising a step e) of putting the wiper blade into motion from its high position, before the step c) begins.

11. The washing method as claimed in claim 10, wherein the step c) is carried out starting from the moment when the wiper blade is in a first predetermined intermediate position, and until the moment when the wiper blade is in a second predetermined intermediate position, in a descending wiping phase.

12. The washing method as claimed in claim 10, wherein the pump system is in the deactivated state and the wiper blade is in the low position for a predetermined pause period T2, after the end of the step e).

13. The washing method as claimed in claim 10, wherein, after the end of the step e), or the pause T2, a step f) of driving the wiper blade from the low position to its high position, and from the high position to the low position is performed.

14. The washing method as claimed in claim 13, wherein, during the step f), the method comprises at least one of the following steps:
    activation of the pump system, in order to eject the first fluid via the orifices, between the moment when the wiper blade is in the low position and the moment when the blade is in a predetermined intermediate position, in a rising wiping phase;
    activation of the pump system, in order to eject the first fluid via the orifices, between the moment when the wiper blade is in an intermediate position and the moment when the blade is in another intermediate position, in a rising wiping phase;
    activation of the pump system in order to eject the first fluid via the orifices, between the moment when the wiper blade is in an intermediate position and the moment when the blade is in the high position, in a rising wiping phase;
    activation of the pump system in order to eject the first fluid via the orifices, between the moment when the wiper blade is in the high position and the moment when the blade is in an intermediate position, in a descending wiping phase;
    activation of the pump system in order to eject the first fluid via the orifices, between the moment when the wiper blade is in an intermediate position and the moment when the blade is in another intermediate position;
    activation of the pump system in order to eject the first fluid via the orifices, between the moment when the wiper blade is in an intermediate position and the moment when the blade is in the low position, in a descending wiping phase; and
    deactivation of the pump system during driving of the wiper blade from the high position to the low position, or from the low position to the high position.

15. The washing method as claimed in claim 14, wherein the pump system is in the deactivated state, and the wiper blade is in the low position, for a predetermined pause period T3 after the step f).

16. The washing method as claimed in claim 14, wherein after the step f) or the pause T3, a step g) of driving the wiper blade from the low position to the high position, and from the high position to the low position is performed.

17. The washing method as claimed in claim 16, wherein, after the step g), a step h) of checking the state of cleanliness of the windscreen is performed.

* * * * *